June 16, 1931.  H. F. THUMANN  1,810,230

POULTRY FEEDER

Filed Jan. 21, 1929

Witness
Orval Floden

Inventor
Henry F. Thumann
by Bair, Freeman & Sinclair
Attorneys

Patented June 16, 1931

1,810,230

UNITED STATES PATENT OFFICE

HENRY F. THUMANN, OF REDFIELD, ARKANSAS

POULTRY FEEDER

Application filed January 21, 1929. Serial No. 333,920.

My invention relates to a feeder particularly designed for use by chickens.

More particularly, it is my object to provide in such a feeder structure, a simple, convenient and efficient arrangement of a hopper.

Still another object is to provide in such a feeder a removable top so arranged that it can be quickly and easily taken off the feeder for permitting access to the interior thereof and easily returned to closure position, and to provide coacting means whereby it will be properly held in such closure position.

Still another object is to provide in connection with such cover a member for preventing chickens from roosting on the cover and novel means for mounting such member.

With these and other objects in view, my invention consists in the construction, arrangement and combination of the various parts of my poultry feeder, whereby the objects contemplated are attained, as hereinafter more fully set forth, pointed out in my claims, and illustrated in the accompanying drawings, in which:

Figure 4:
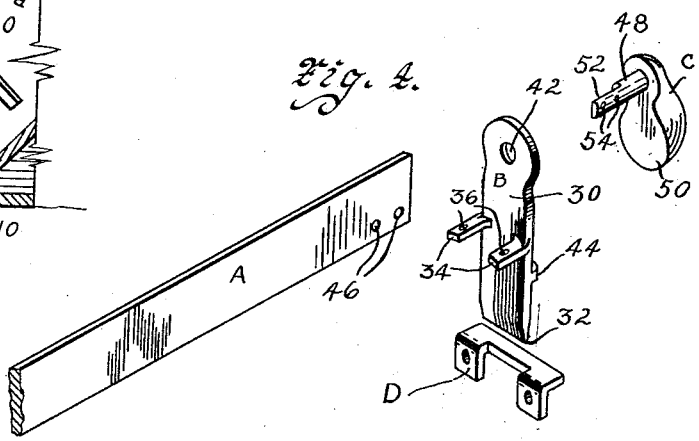

Figure 4 is a perspective view of a portion of the member A for preventing the chickens from roosting on the feeder, a perspective view of the bracket B whereby the cover is held on the feeder and whereby the member A is supported, a perspective view of the member C by which the member A is mounted on the member B, and a perspective view of the member D which cooperates with the member B for holding the cover in place on the feeder.

My feeder is extremely simple in construction, comprising a bottom member with shallow side walls and with complete end members, carrying supporting means for the hopper walls, removable hopper walls, and a removable top, carrying the device for preventing chickens from roosting on the feeder.

In the drawings herewith, I have used the reference numeral 10 to indicate generally the bottom, which preferably is of wood, but may be made of any other suitable material.

Figure 3:
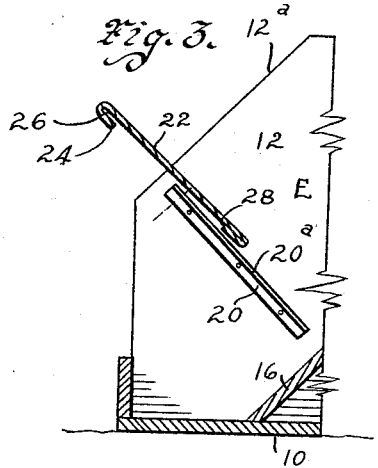
Figure 3 is a transverse, sectional view, similar to that shown in Figure 2, the cover being removed and part of the feeder being broken away, and one of the hopper wall members being shown separate from its supports.

The bottom member 10 has the full end members 12, the upper corners of which are inclined, as indicated at 12a in Figure 3.

The bottom member 10 has the shallow side walls 14, which form the outer walls of feeding troughs.

Figure 2:
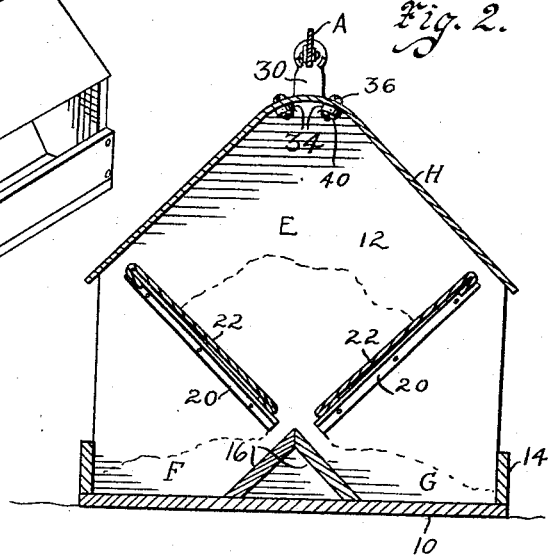
Figure 2 is a transverse, sectional view thereof taken on the line 2—2 of Figure 1.

Extending lengthwise of the bottom 10 on its upper surface is a divider ridge 16, not heretofore mentioned, which in vertical cross section has the form of an inverted V, as shown in Figure 2.

Each end member 12 is provided with a pair of angle iron supports 20. Each support 20 extends from the point near the side edge of the member 12 at the upper part of the vertical portion thereof, and is inclined thence downwardly and inwardly, terminating short of the divider ridge 16.

These supports 20 are for holding hopper walls. Each hopper wall is made of a sheet 22 adapted to fit between the ends 12 and to rest on the corresponding members 20 on the opposite members 12.

Each member 22 has on its under surface at its upper part a shoulder 24, which may be formed in any way to engage the upper ends of the members 20, so as to prevent the hopper wall 22 from sliding downwardly.

The wall 22 is preferably made of sheet metal and the shoulder 24 is preferably formed by bending the upper edge of the wall 24 downwardly, and thence for a short distance parallel with the body of the wall 22, as shown in Figure 3, thus forming a channel indicated at 26, the ends of which may receive the inwardly projected flanges 20a of the supports 20, as shown in Figure 2.

When the walls 22 are made of sheet metal, the lower edge of each support 20 is preferably folded over as at 28 to form a reinforced edge.

It will be seen that when the two walls 22 are placed in position for use as illustrated in Figure 2, these walls in cooperation with the end walls 12 form a hopper, tapered toward its lower end, and open at its lower end above the divider ridge 16.

Chopped or ground grain may then be placed in this hopper and will pass downwardly from the hopper, indicated at E, into the respective troughs indicated at F and G.

The cover H for my improved feeder may be made of any suitable material, but I prefer sheet metal. The cover is in the form of a channel, substantially in the form of an inverted V in cross section, as illustrated for instance in Figure 2, and is of such width as to overhang the side edges of the feeder slightly, and is of such length that its ends will rest upon the upper edges of the ends 12 of the feeder.

For holding the cover on the feeder against accidental displacement, I provide a couple of brackets B, one of which is illustrated in detail in Figure 4. The bracket B comprises an upright strip 30 slightly tapered toward an edge 32 to facilitate the insertion of the bracket 30 into a keeper hereinafter referred to. Each bracket 30 has on what may be called its inner side a pair of horizontal, inwardly projecting lugs 34, provided with holes 36. These lugs rest just below the ends of the cover as shown best perhaps in Figure 2, and are secured thereto by short screws 36 and nuts 40.

The upper faces of the lugs 34 are so inclined as to fit snugly under the surface of the cover H.

Each bracket 30 has in its upper part a hole 42.

The body of the bracket B extends upwardly substantially beyond the lugs 34. The face of the bracket B on the opposite side thereof from the lugs 34 is provided with a shoulder 44 to rest against the hopper, now to be described.

Figure 1:
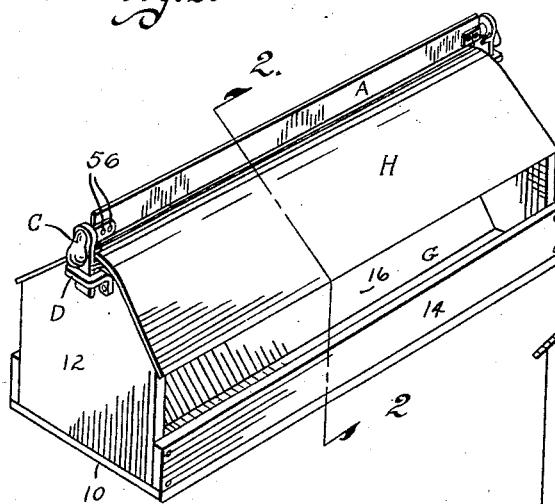
Figure 1 is a perspective view of an animal feeder embodying my invention.

For coacting with the lower parts of the brackets B and thus holding the cover H snugly in position on the feeder, I provide on the outer surface of each end 12 at the upper part thereof a keeper D, shown in Figures 1 and 4, into which the lower ends of the brackets B may be slipped, and against which the shoulders 44 may engage.

The cover H carries a member for preventing chickens from roosting on the feeder, and including the strip A shown in Figure 4, having at its ends the hole 46.

For mounting the strip A on the cover for suitably accomplishing its purpose, I provide a pair of members C, one of which is shown in perspective in Figure 4.

The member C comprises a short spindle or the like 48, which has at one end an offset weighted head 50 and at the other end a flat portion 52, which is provided with holes 54 corresponding in their spacing to the spacing of the holes 46.

In assembling the parts, the spindle 48 is slipped through the hole 42 from the outside end and is then riveted to the member A, as at 56 (Figure 1). Thus when the cover is placed on the feeder, as shown for instance in Figures 1 and 2, the weighted head 50 hangs down and holds the strip A in vertical position.

If a fowl jumps upon the feeder and attempts to roost on the strip A, the strip will tilt or rock, and the fowl will be tipped off, whereupon the strip A will resume its upright normal position.

It will be noted that the holes 46 are in the lower part of the strip A, so that when in normal position, the greater part of the strip A projects above the rivets 56.

I have in my present feeder provided a structure which is extremely simple to cut out and assemble. My feeder has a minimum number of parts and requires, I believe, the very least amount of material, which may be such as will be readily available almost anywhere.

It will be obvious that the parts may be conveniently shipped in knock-down form.

The ends 12 are preferably nailed to the bottom 10, and the sides 14, and may be assembled therewith after shipment. The tops H may be nested conveniently for shipment and storage. The top member H carries the tipping strip A in such manner that the tipping strip does not interfere in any way with the manipulation of the cover.

I claim as my invention:

1. In a feeder of the class described, a bottom member having a longitudinal divider ridge, relatively shallow side walls for forming the outer portions of troughs, end members projecting upwardly from the bottom member and above the side members, inclined supports mounted on the inner surfaces of the end members for supporting hopper walls so as to form a hopper tapered toward said divider ridge, removable hopper walls detachably resting on said supports having shoulders at their upper edges for engaging the supports for limiting the downward movement of the hopper walls, and a cover member for the feeder.

2. A feeder of the class described including a cover, brackets at the ends of said cover, having lugs secured to the cover and having engaging shoulders and journaling holes, keepers on the ends of said feeder for receiving the lower ends of said brackets and adapted to be engaged by said shoulders, a strip above the cover, spindle members journaled in said holes and secured to said strip, and weighted end members on said spindle members for holding the strip in a vertical plane.

Des Moines, Iowa, January 8, 1929.

HENRY F. THUMANN.